Oct. 16, 1928.
O. C. STAPLES
COMBINATION CLAMP
Filed Jan. 3, 1928
1,687,851
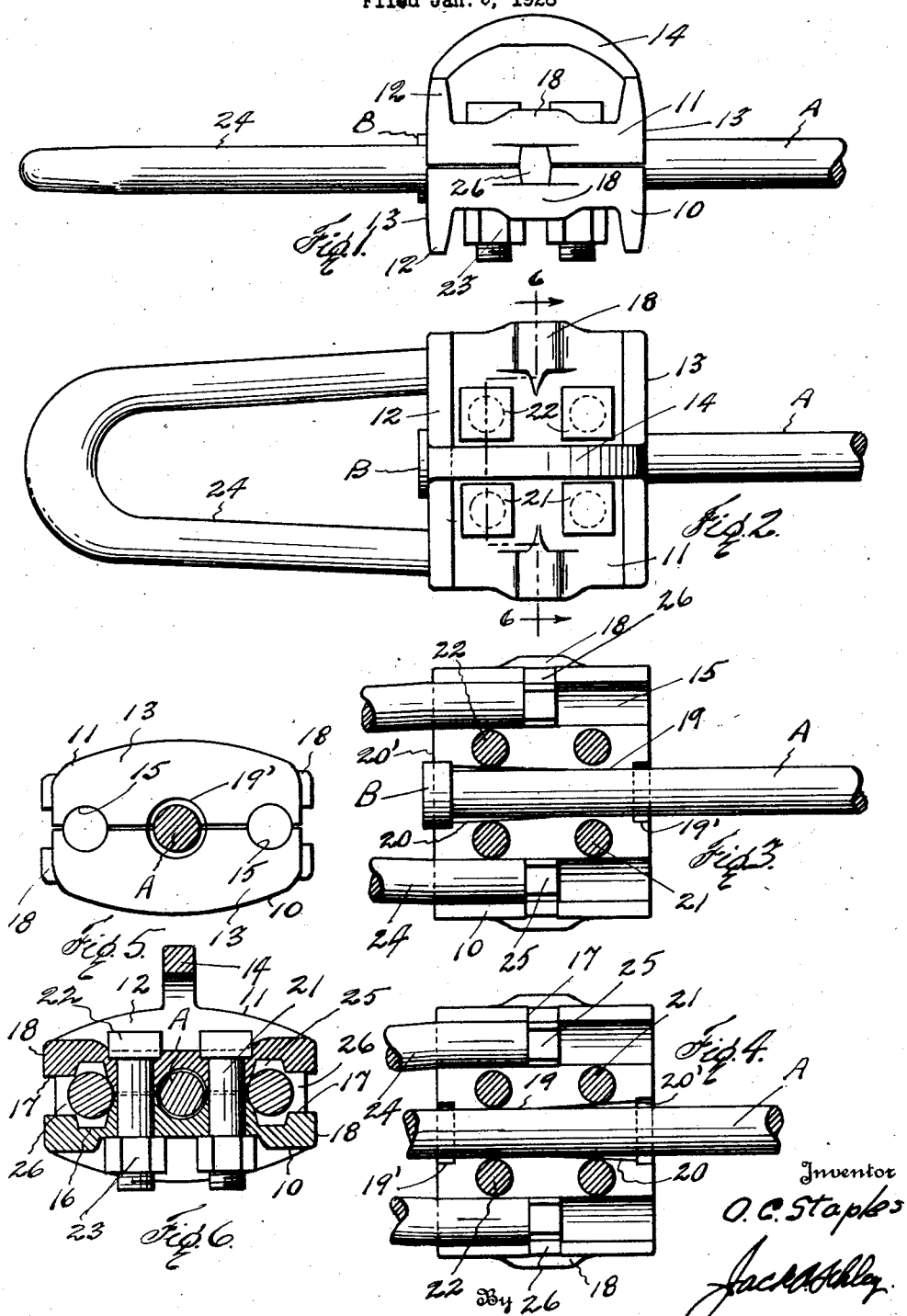
Inventor
O. C. Staples
By Jack Ashley
Attorney Patented Oct. 16, 1928.

1,687,851

UNITED STATES PATENT OFFICE.

OSCAR C. STAPLES, OF TULSA, OKLAHOMA.

COMBINATION CLAMP.

Application filed January 3, 1928. Serial No. 244,186.

This invention relates to new and useful improvements in combination clamps.

One object of the invention is to provide a clamp comprising members which may be secured about the end of a rod and the ends of a pull loop secured between such members in such a way that the rod and loop may be reversed if desired.

Another object of the invention is to provide a clamp comprising a pair of members arranged so as to clamp either a broken or straight rod or an upset rod as is required.

A still further object of the invention is to provide a pull loop having its ends secured in the clamp against displacement and arranged to be reversed when the clamp is reversed.

A particular feature of the invention is to provide the clamp with flat end faces so that either face may be placed against an upright support; while an additional feature resides in a handle whereby the clamp may be safely held by the workman.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a plan view of a clamp constructed in accordance with the invention and showing a portion of a rod connected therein, Fig. 2 is an elevation of the same, Fig. 3 is a fragmentary view showing one of the clamp members with portions of a headed rod and a pull loop in position therein, Fig. 4 is a similar view showing the parts reversed and a straight or broken rod in place, Fig. 5 is an end view of the clamp, and Fig. 6 is a cross-sectional view taken on the line 6—6 of Fig. 2.

In the drawings the numeral 10 designates a clamp member and 11 a complementary clamp member, each composing substantially one-half of the clamp. Each clamp member is provided with laterally extending vertical ribs or flanges 12 at each end, whereby said members are formed with flat end faces 13 for engaging an upright support. The member 11 is provided at its central portion with an arched handle 14 by which the clamp may be supported in the hand of the workman, thus making for safety and convenience.

Each member 10 and 11 is provided near its upper and lower edges with longitudinal concaved grooves 15, each bisected at its center by an angular sump or socket 16 from which a notch 17 extends outwardly. The grooves extend at right-angles to the flanges 12 and are contiguous to the upper and lower edges of each clamp member. At each socket and notch a reinforcing boss 18 is cast on the member, the bottom of the notch being flush with the inner surface of the boss and the socket being sunk below the notch.

Each clamp member has at its center and extending longitudinally between the grooves, a concaved rectilinear groove 19 extending substantially half the width of the plate and an outwardly flared concaved groove 20 extending from the inner end of the groove 19. At the end of each groove 19 is an enlarged concentric seat 19′, while a similar seat 20′ is formed at the outer end of each groove 20.

Two pairs of bolts 21 are passed through apertures 22 in the members on each side of the grooves 19 and 20 and between the grooves 15. The heads of these bolts are countersunk in the outer surface of the member 11 and nuts 23 screwed onto the ends of the bolts engage the outer side of the member 10, whereby said clamp members are securely fastened in position and may be readily disconnected.

A U-shaped pull loop 24 is provided at its inner ends with upset heads 25 and outwardly directed lugs 26. The heads engage in the socket 16 and the lugs 26 are received in the notches 17, while the shanks of the loop rest in the grooves 15. It will be seen that the loop may be inserted between the members so as to project from either end of the grooves 15. The angular heads and lugs preclude pulling out of the loop and thus not only make for efficiency, but for safety as well.

In Fig. 3 I have shown a rod A provided with a circular head B engaging in the seat 20′. If the rod was upset under the head or upset and not provided with a head, it would fit the flared grooves 20. Frequently the rods break and in such cases the clamp members may be separated and the loop reversed so that the straight end of the rod A may be inserted in the grooves 15, as is shown in Fig. 4. When the nuts 23 are tightened the clamp members will be tightly fastened on the rod and pull loop so that these parts can not become dislodged.

The clamp is compact and has sufficient strength, owing to the flanges 12 and the bosses 18, to stand up under heavy work. The flat faces 13 permit the clamp to be firmly supported against an upright flat surface. The handle 14 enables the workman to easily grasp the clamp and hold it, particularly when disconnecting the pull loop 24 from its connection. It is merely necessary to remove the four nuts 23 to disassembled the clamp members, and by reason of said nuts the said clamp may be tighened to the proper degree.

Various changes in the size and shape of the different parts, as well as modifications and alterations, may be made within the scope of the appended claims.

What I claim, is:

1. A combination clamp comprising a pair of clamp members having sockets and rod grooves, a pull loop having heads engaging in the sockets, bolts securing said members together and for clamping them about a pull rod, and an arched handle on one of the clamp members for supporting the clamp.

2. A combination clamp comprising a pair of clamp members having sockets and rod grooves, a pull loop having heads engaging in the sockets, and bolts securing said members together and for clamping them about a pull rod, said clamp members being reversible for receiving a broken rod and provided with flat supporting end faces.

3. A combination clamp comprising a pair of clamp members bolted together, and a pull loop having its ends secured between the clamp members, said clamp members having longitudinal rod receiving grooves having rectilinear and flared portions for receiving straight and upset rods.

4. A combination clamp comprising a pair of clamp members bolted together, and a pull loop having its ends secured between the clamp members, said clamp members having longitudinal rod receiving grooves having rectilinear and flared portions for receiving straight and upset rods, said loop being reversible in said members, whereby a rod may be inserted in either end of the clamp.

5. A combination clamp comprising a pair of clamp members bolted together, each member having grooves contiguous to its top and bottom bisected by sockets, and a pull loop engaging in the said grooves and having heads engaging in the sockets of said members, said clamp members also having means for clamping a rod therebetween.

6. A combination clamp comprising a pair of clamp members bolted together, each member having grooves contiguous to its top and bottom bisected by sockets, and a pull loop engaging in the said grooves and having heads engaging in the sockets of said members, the clamp members having reinforcing bosses at the sockets and also notches at said bosses, said loop heads also having lugs engaging in said notches.

In testimony whereof I affix my signature.

OSCAR C. STAPLES.